US008457835B2

(12) United States Patent
Nigam

(10) Patent No.: US 8,457,835 B2
(45) Date of Patent: Jun. 4, 2013

(54) SYSTEM AND METHOD FOR USE IN EVALUATING AN OPERATION OF A COMBUSTION MACHINE

(75) Inventor: Gaurav Nigam, Gautam Budh Nagar (IN)

(73) Assignee: General Electric Company, Schenectady, NY (US)

( * ) Notice: Subject to any disclaimer, the term of this patent is extended or adjusted under 35 U.S.C. 154(b) by 242 days.

(21) Appl. No.: 13/082,804

(22) Filed: Apr. 8, 2011

(65) Prior Publication Data

US 2012/0259502 A1 Oct. 11, 2012

(51) Int. Cl.
*G01M 17/00* (2006.01)
*G06F 7/00* (2006.01)
*G06F 11/30* (2006.01)
*G06F 19/00* (2006.01)
*G07C 5/00* (2006.01)

(52) U.S. Cl.
USPC ....... 701/29.9; 701/34.4; 701/29.7; 701/30.4; 701/30.8; 701/31.1; 340/577; 340/578

(58) Field of Classification Search
None
See application file for complete search history.

(56) References Cited

U.S. PATENT DOCUMENTS

| | | | | | |
|---|---|---|---|---|---|
| 4,395,638 | A | * | 7/1983 | Cade | 250/554 |
| 4,403,943 | A | * | 9/1983 | Stella et al. | 431/31 |
| 4,494,924 | A | * | 1/1985 | Tanaka et al. | 431/78 |
| 4,541,410 | A | * | 9/1985 | Jatana | 122/18.3 |
| 4,591,725 | A | * | 5/1986 | Bryant | 250/554 |
| 4,641,631 | A | * | 2/1987 | Jatana | 126/101 |
| 4,823,114 | A | * | 4/1989 | Gotisar | 340/578 |
| 5,026,272 | A | * | 6/1991 | Takahashi et al. | 431/79 |
| 5,077,550 | A | * | 12/1991 | Cormier | 340/578 |
| 5,170,621 | A | | 12/1992 | Barnum et al. | |
| 5,236,328 | A | * | 8/1993 | Tate et al. | 431/14 |
| 5,339,070 | A | * | 8/1994 | Yalowitz et al. | 340/578 |
| 5,365,223 | A | * | 11/1994 | Sigafus | 340/693.1 |
| 5,506,569 | A | * | 4/1996 | Rowlette | 340/577 |
| 5,521,227 | A | | 5/1996 | Palazzotto et al. | |
| 5,812,061 | A | * | 9/1998 | Simons | 340/815.45 |
| 5,979,160 | A | * | 11/1999 | Yashiki et al. | 60/276 |
| 6,078,050 | A | * | 6/2000 | Castleman | 250/339.15 |
| 6,442,943 | B1 | | 9/2002 | Harrison et al. | |
| 6,478,573 | B1 | * | 11/2002 | Chian | 431/6 |
| 6,486,486 | B1 | * | 11/2002 | Haupenthal | 250/554 |
| 6,518,574 | B1 | * | 2/2003 | Castleman | 250/339.15 |
| 7,088,253 | B2 | * | 8/2006 | Grow | 340/578 |

(Continued)

OTHER PUBLICATIONS

Automation and Control Solutions, C7012A, C, E, F, G Solid State Purple Peeper® Ultraviolet Flame Detectors, M.S. Rev. 09-05, 20 pages, Honeywell International Inc.

*Primary Examiner* — Thomas Tarcza
*Assistant Examiner* — Richard Goldman
(74) *Attorney, Agent, or Firm* — Armstrong Teasdale LLP

(57) ABSTRACT

A method for use in evaluating an operation of a combustion machine. A plurality of current average intensities is calculated by a computing device based on a series of intensity readings from a flame sensor. Each current average intensity corresponds to a current time interval. The computing device selects a plurality of past average intensities, each of which corresponds to a past time interval equal in duration to the current time interval corresponding to a current average intensity. The computing device calculates a plurality of decay rates indicating a change in intensity readings over a current time interval based on the current average intensities and the past average intensities. The computing device estimates a predicted flame sensor malfunction time based on the plurality of decay rates.

20 Claims, 3 Drawing Sheets

U.S. PATENT DOCUMENTS

| | | | |
|---|---|---|---|
| 7,244,946 B2* | 7/2007 | Burnette et al. | 250/372 |
| 7,495,519 B2* | 2/2009 | Kim et al. | 331/44 |
| 7,728,736 B2* | 6/2010 | Leeland et al. | 340/578 |
| 7,768,410 B2* | 8/2010 | Chian | 340/577 |
| 7,893,615 B2* | 2/2011 | Cole | 313/539 |
| 8,066,508 B2* | 11/2011 | Nordberg et al. | 431/75 |
| 2002/0011570 A1* | 1/2002 | Castleman | 250/339.15 |
| 2003/0141979 A1* | 7/2003 | Wild et al. | 340/577 |
| 2005/0174244 A1* | 8/2005 | Grow | 340/577 |
| 2006/0202844 A1* | 9/2006 | Farley | 340/577 |
| 2007/0150136 A1* | 6/2007 | Doll et al. | 701/34 |
| 2009/0002148 A1* | 1/2009 | Horvitz | 340/514 |
| 2009/0098492 A1* | 4/2009 | Chiu et al. | 431/6 |
| 2009/0204232 A1* | 8/2009 | Guru et al. | 700/9 |
| 2011/0174891 A1* | 7/2011 | Kowald et al. | 237/53 |
| 2012/0259502 A1* | 10/2012 | Nigam | 701/30.2 |

* cited by examiner

SYSTEM AND METHOD FOR USE IN EVALUATING AN OPERATION OF A COMBUSTION MACHINE

BACKGROUND OF THE INVENTION

The subject matter disclosed herein relates generally to combustion machines and, more specifically, to systems and methods for use in evaluating the operation of a combustion machine having a flame sensor.

At least some known combustion machines, such as combustion engines, include one or more flame sensors that detect ultraviolet (UV) radiation. In such machines, relatively high UV radiation indicates the presence of a flame, whereas relatively low UV radiation indicates the absence of a flame. When the flame sensor indicates the absence of a flame (a "flame-out" condition), a combustion machine controller may abruptly disable the combustion machine, such as by terminating fuel delivery, to prevent a hazardous build-up of combustible fuel.

The operation of a flame sensor may deteriorate over time due to, for example, the accumulation of dirt and/or combustion byproducts on the sensor (e.g., on the sensor lens). More specifically, the accumulation of such materials may cause the flame sensor to under-detect UV radiation. Further, such materials, when positioned between the flame sensor and a flame, may absorb a portion of the UV radiation produced by the flame and thus reduce the amount of UV radiation detected by the sensor. Accordingly, the flame sensor may indicate the absence of a flame when a flame is present. Such an errant indication may be referred to as a false negative result or a "fake flame-out" condition. The controller may be unable to distinguish a fake flame-out condition from a true flame-out condition. Accordingly, the controller may abruptly disable the combustion machine, decreasing output and/or exposing the combustion machine to unnecessary wear.

BRIEF DESCRIPTION OF THE INVENTION

This Brief Description is provided to introduce a selection of concepts in a simplified form that are further described below in the Detailed Description. This Brief Description is not intended to identify key features or essential features of the claimed subject matter, nor is it intended to be used as an aid in determining the scope of the claimed subject matter.

In one aspect, a system for use in evaluating an operation of a combustion engine including a flame sensor is provided. The system includes a memory device and a processor coupled in communication with the memory device. The memory device is configured to store a plurality of intensity readings from a flame sensor and a plurality of past average intensities. Each intensity reading is associated with a time, and each past average intensity is associated with a past time interval. The processor is programmed to calculate a plurality of current average intensities based on the intensity readings. Each current average intensity corresponds to a current time interval. The processor is also programmed to compare each current average intensity to a past average intensity associated with a past time interval corresponding to the current time interval associated with the current average intensity to create a plurality of decay rates, and to estimate a predicted flame sensor malfunction time based on the plurality of decay rates.

In another aspect, a method for use in evaluating an operation of a combustion engine including a flame sensor is provided. A plurality of current average intensities is calculated by a computing device based on a series of intensity readings from a flame sensor. Each current average intensity corresponds to a current time interval. The computing device selects a plurality of past average intensities, each of which corresponds to a past time interval equal in duration to the current time interval corresponding to a current average intensity. The computing device calculates a plurality of decay rates indicating a change in intensity readings over time based on the current average intensities and the past average intensities. Each decay rate corresponds to a current time interval. The computing device estimates a predicted flame sensor malfunction time based on the plurality of decay rates.

In yet another aspect, one or more non-transitory computer-readable storage media having computer-executable instructions embodied thereon are provided. When executed by at least one processor, the computer-executable instructions cause the processor to calculate a plurality of current average intensities based on a series of intensity readings from a flame sensor. Each current average intensity corresponds to a current time interval. The computer-executable instructions also cause the processor to calculate a plurality of decay rates indicating a change in intensity readings over time based on the current average intensities and a plurality of past average intensities. Each decay rate corresponds to a current time interval. The computer-executable instructions further cause the processor to estimate a predicted flame sensor malfunction time based on the plurality of decay rates.

BRIEF DESCRIPTION OF THE DRAWINGS

The embodiments described herein may be better understood by referring to the following description in conjunction with the accompanying drawings.

DETAILED DESCRIPTION OF THE INVENTION

The embodiments described herein provide monitoring of a flame in a combustion engine and enable determining a time at which a flame sensor will produce a false negative result that is indicative of the absence of a flame when a flame is actually present. Specifically, in some embodiments, a plurality of decay rates, representing a decrease in detected flame intensity over time, is calculated, and a minimum decay rate is used to estimate a predicted flame sensor malfunction time.

An exemplary technical effect of the methods, systems, and apparatus described herein includes at least one of (a) calculating a plurality of current average intensities based on a series of intensity readings from a flame sensor, wherein each current average intensity corresponds to a current time interval; (b) selecting a plurality of past average intensities, wherein each past average intensity corresponds to a past time interval equal in duration to the current time interval corresponding to a current average intensity; (c) calculating by the computing device a plurality of decay rates indicating a change in intensity readings over time based on the current average intensities and the past average intensities, wherein each decay rate corresponds to a current time interval; (d)

estimating a predicted flame sensor malfunction time based on the plurality of decay rates; (e) selecting from the series of intensity readings a plurality of recent intensity readings associated with a time that is within a predetermined duration of a current time; (f) providing a low flame intensity alarm when the recent intensity readings are below a predetermined threshold value; and (g) indicating whether a flame sensor is malfunctioning.

Figure 1:
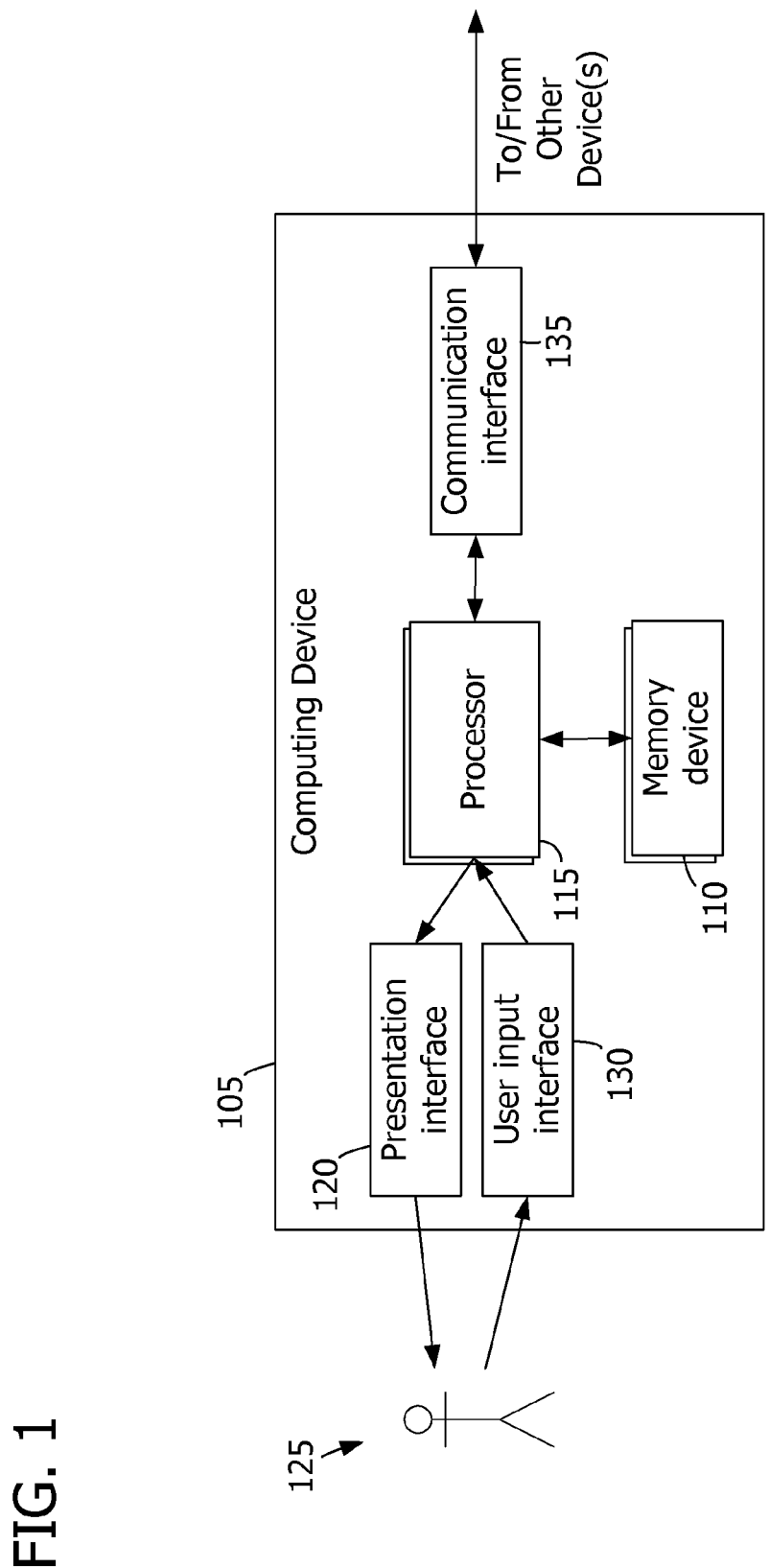
FIG. 1 is a block diagram of an exemplary computing device that may be used to monitor and/or control the operation of a combustion machine.

FIG. 1 is a block diagram of an exemplary computing device 105 that may be used to monitor and/or control the operation of a combustion machine. Computing device 105 includes a memory device 110 and a processor 115 coupled to memory device 110 for executing instructions. In some embodiments, executable instructions are stored in memory device 110. Computing device 105 is configurable to perform one or more operations described herein by programming processor 115. For example, processor 115 may be programmed by encoding an operation as one or more executable instructions and providing the executable instructions in memory device 110. Processor 115 may include one or more processing units (e.g., in a multi-core configuration).

In the exemplary embodiment, memory device 110 is one or more devices that enables information such as executable instructions and/or other data to be stored and retrieved. Memory device 110 may include one or more computer readable media, such as, without limitation, dynamic random access memory (DRAM), static random access memory (SRAM), a solid state disk, and/or a hard disk. Memory device 110 may be configured to store, without limitation, flame sensor intensity readings, average intensities, decay rates, configuration parameters (e.g., threshold values and/or durations), maintenance tasks, and/or any other type of data. In some embodiments, processor 115 removes or "purges" data from memory device 110 based on the age of the data. For example, processor 115 may remove flame sensor intensity readings associated with a time that is older than the longest past time interval over which an average intensity may be calculated, as described below. In addition, or alternatively, processor 115 may remove flame sensor intensity readings that do not indicate a decrease in detected flame intensity over time.

In some embodiments, computing device 105 includes a presentation interface 120 that is coupled to processor 115. Presentation interface 120 presents information, such as a user interface and/or an alarm to a user 125. For example, presentation interface 120 may include a display adapter (not shown in FIG. 1) that may be coupled to a display device, such as a cathode ray tube (CRT), a liquid crystal display (LCD), an organic LED (OLED) display, and/or an "electronic ink" display. In some embodiments, presentation interface 120 includes one or more display devices. In addition to, or in the alternative, presentation interface 120 may include an audio output device (e.g., an audio adapter and/or a speaker) and/or a printer. In some embodiments, presentation interface 120 presents an alarm and/or a maintenance task associated with a flame sensor (shown in FIG. 2), such as by using a human machine interface (HMI).

In some embodiments, computing device 105 includes a user input interface 130. In the exemplary embodiment, user input interface 130 is coupled to processor 115 and receives input from user 125. User input interface 130 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone). A single component, such as a touch screen, may function as both a display device of presentation interface 120 and user input interface 130.

A communication interface 135 is coupled to processor 115 and is configured to be coupled in communication with one or more other devices, such as a sensor or another computing device 105, and to perform input and output operations with respect to such devices. For example, communication interface 135 may include, without limitation, a wired network adapter, a wireless network adapter, a mobile telecommunications adapter, a serial communication adapter, and/or a parallel communication adapter. Communication interface 135 may receive data from and/or transmit data to one or more remote devices. For example, a communication interface 135 of one computing device 105 may transmit an alarm and/or a maintenance task to the communication interface 135 of another computing device 105.

Presentation interface 120 and/or communication interface 135 are both capable of providing information suitable for use with the methods described herein (e.g., to user 125 or another device). Accordingly, presentation interface 120 and communication interface 135 may be referred to as output devices. Similarly, user input interface 130 and communication interface 135 are capable of receiving information suitable for use with the methods described herein and may be referred to as input devices.

Figure 2:
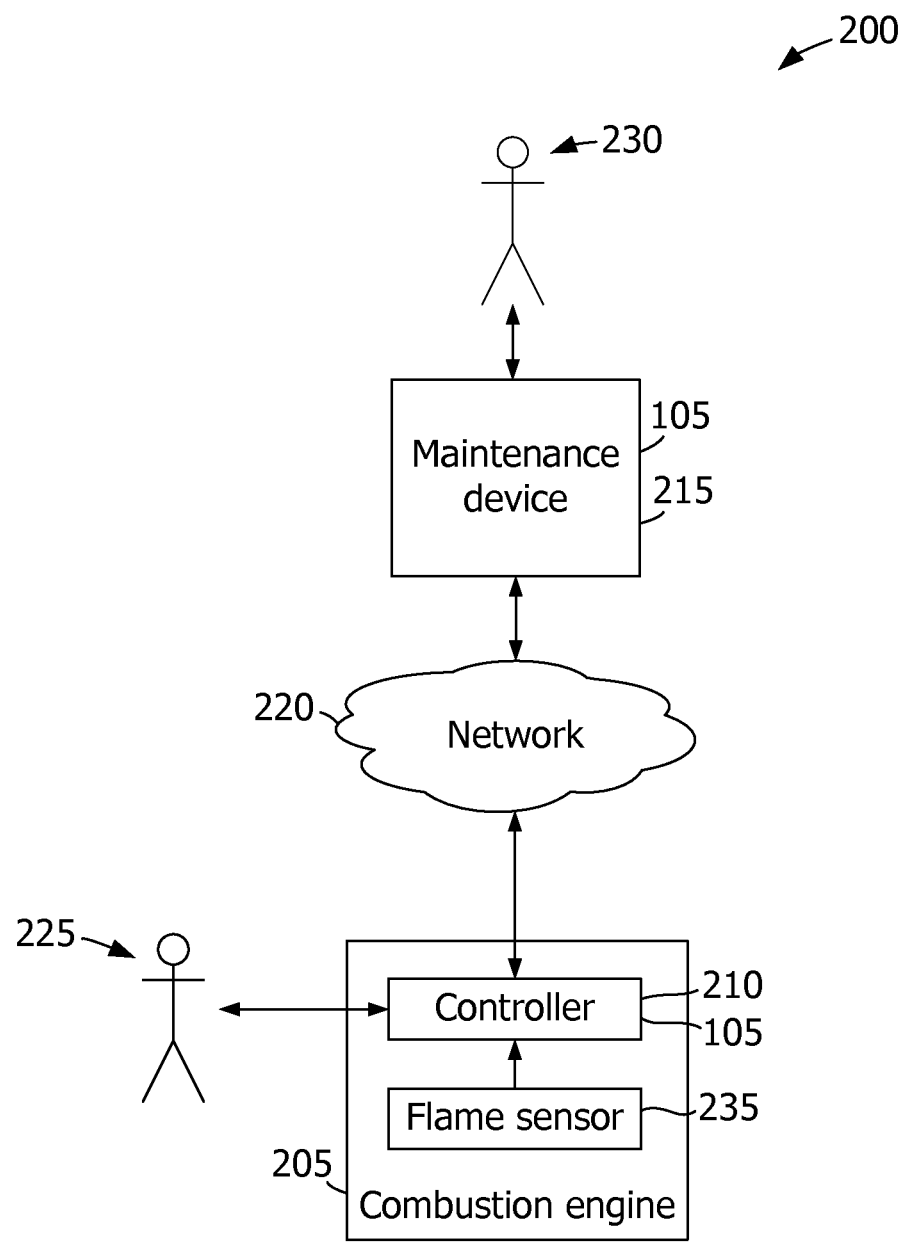
FIG. 2 is block diagram of an exemplary combustion engine monitoring system that includes a combustion engine, and a combustion engine controller and a maintenance device that are coupled in communication via a network.

FIG. 2 is block diagram of an exemplary system 200 that may be used to monitor and/or operate a combustion engine 205. In the exemplary embodiment, system 200 includes a combustion engine controller 210 and a maintenance device 215 that are coupled in communication with each other via a network 220. Network 220 may include, without limitation, the Internet, a local area network (LAN), a wide area network (WAN), a wireless LAN (WLAN), a mesh network, and/or a virtual private network (VPN). While certain operations are described below with respect to particular computing devices 105, it is contemplated that any computing device 105 may perform one or more of the described operations. For example, controller 210 may perform all of the operations below.

Referring to FIGS. 1 and 2, controller 210, and maintenance device 215 are computing devices 105. In the exemplary embodiment, each computing device 105 is coupled to network 220 via communication interface 135. In an alternative embodiment, controller 210 is integrated with maintenance device 215.

Controller 210 interacts with an operator 225 (e.g., via user input interface 130 and/or presentation interface 120). For example, controller 210 may present information about combustion engine 205, such as alarms, to operator 225. Maintenance device 215 interacts with a technician 230 (e.g., via user input interface 130 and/or presentation interface 120). For example, maintenance device 215 may present alarms and/or maintenance tasks to technician 230.

Combustion engine 205 includes one or more flame sensors 235. In exemplary embodiments, flame sensor 235 detects the level of ultraviolet (UV) radiation within a combustion chamber (not shown). For example, flame sensor 235 may be directed at a position in the combustion chamber at which fuel is ignited. Flame sensor 235 repeatedly (e.g., periodically, continuously, and/or upon request) transmits an intensity reading that indicates the intensity of UV radiation at that position at the current time. For example, flame sensor 235 may produce an electrical current between a minimum value (e.g., 4 milliamps) indicating that no UV radiation is detected and a maximum value (e.g., 20 milliamps) indicating that a highest detectable amount of UV radiation is detected.

Controller 210 receives and processes the intensity readings, as described below with reference to FIG. 3.

Figure 3:
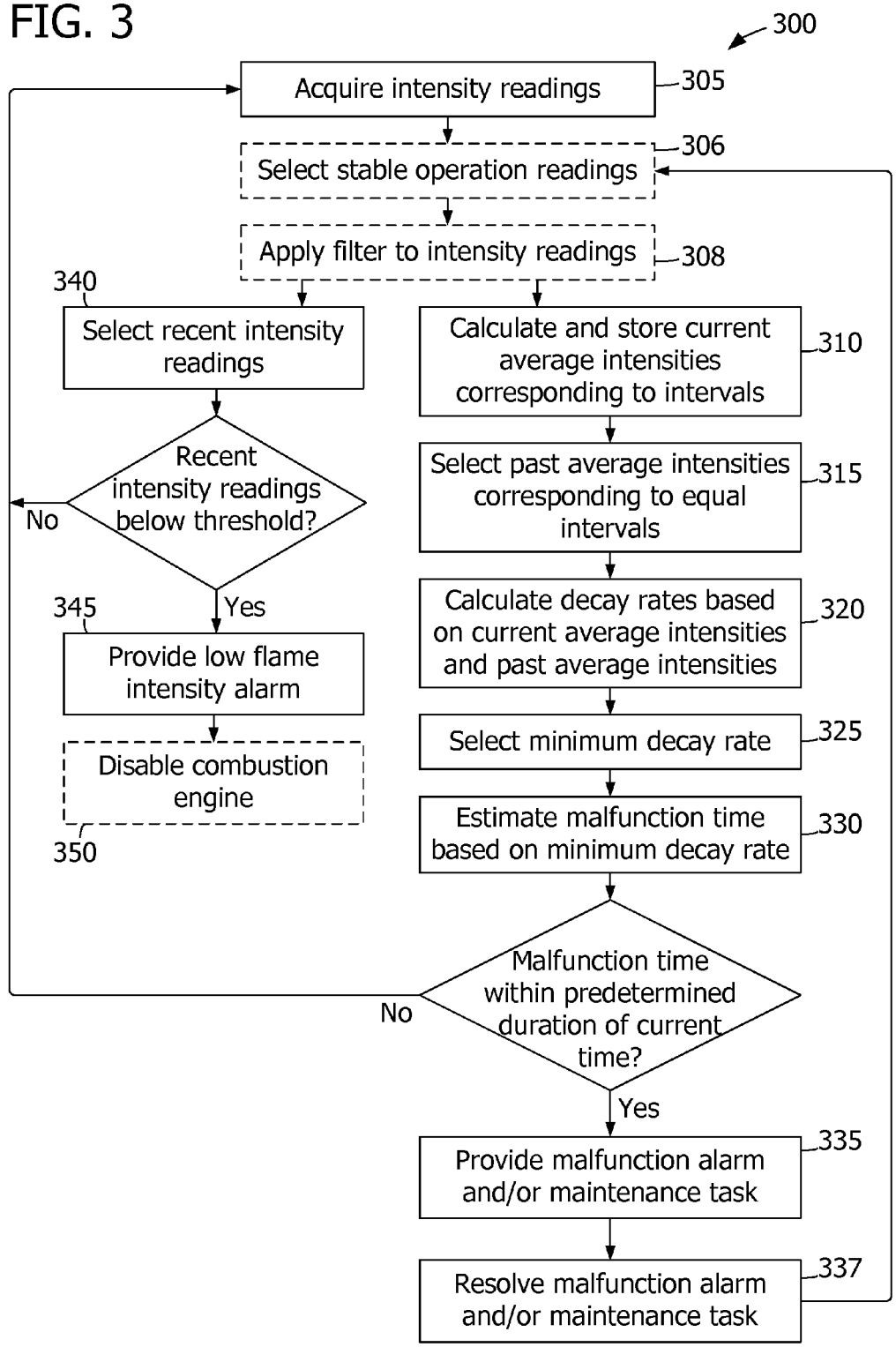
FIG. 3 is a flowchart of an exemplary method that may be implemented to evaluate an operation of a combustion engine.

FIG. 3 is a flowchart of an exemplary method 300 that may be implemented to evaluate an operation of a combustion machine, such as combustion engine 205 (shown in FIG. 2). Portions of method 300 may be implemented, for example, using any one of or any combination of computing devices 105 in system 200 (shown in FIG. 2). Further, in exemplary embodiments, method 300 is performed repeatedly (e.g., periodically, continuously, and/or upon request).

Referring to FIGS. 2 and 3, in exemplary embodiments, controller 210 acquires 305 intensity readings from flame sensor 235. For example, flame sensor 235 may continuously transmit a signal representing a current intensity reading, and controller 210 may acquire 305 intensity readings by sampling the signal.

In some embodiments, controller 210 applies 308 a filter, such as a second order low-pass filter, to the intensity readings before further processing. Such a filter may remove oscillation noise from the intensity readings. For example, when high frequency noise is present in the output of flame sensor 235, controller 210 may apply 308 a filter with a cut frequency approximately equal to (e.g., within 1%, 3%, or 5% of) the oscillation frequency divided by one hundred. In another example, when sinusoidal oscillations are present, the cut frequency may be approximately equal to the oscillation frequency divided by ten.

Controller 210 calculates and stores 310 a plurality of current average intensities based on the intensity readings. Each current average intensity corresponds to a current time interval. Stored average intensities may later be used by controller 210 as past average intensities, as described below.

Controller 210 selects 315 a plurality of past average intensities, each of which corresponds to a past time interval that is equal in duration to the current time interval corresponding to a current average intensity. For example, if controller 210 calculates 310 a current weekly intensity and a current monthly intensity, controller 210 may select 315 a past weekly intensity and a past monthly intensity. Accordingly, selecting 315 the past average intensities creates pairs of corresponding average intensities, with each pair including a past average intensity and a current average intensity that correspond to equal-length intervals. In exemplary embodiments, corresponding average intensities correspond to consecutive intervals. For example, a current weekly average intensity may correspond to the previous seven days, and a past weekly average intensity may correspond to the seven days before the previous seven days.

Controller 210 calculates 320 a plurality of decay rates indicating a change in intensity readings over time based on the current average intensities and the past average intensities. Each decay rate corresponds to a current time interval. In exemplary embodiments, a decay rate is calculated 320 for each pair of corresponding average intensities. For example, controller 210 may calculate 320 a daily decay rate, a weekly decay rate, a monthly decay rate, and/or an annual decay rate. Equation 1 is a function for determining a decay rate based on based on average intensities:

$$D_x = \frac{Y_x - Y_{x\_old}}{T_x} \quad \text{(Eq. 1)}$$

In Equation 1, $T_x$ is a time interval duration (e.g., a day or a week), $Y_x$ is a current average intensity corresponding to a current time interval of duration $T_x$, and $Y_{x\_old}$ is a past average intensity corresponding to a past time interval of duration $T_x$. $D_x$ represents the decay in indicated flame intensity over the current duration.

In exemplary embodiments, intensities $Y_x$ and $Y_{x\_old}$ are expressed as a percentage of a maximum intensity. Equation 2 is an exemplary function for calculating an intensity percentage i when flame sensor 235 indicates intensity as an indicated current $I_{indicated}$ between a minimum value $I_{min}$ and a maximum value $I_{max}$.

$$i = \frac{I_{indicated} - I_{min}}{I_{max} - I_{min}} \cdot 100 \quad \text{(Eq. 2)}$$

The result of Equation 2 is a percentage value between zero and one hundred, with zero percent representing no detected UV radiation and one hundred percent representing maximum UV radiation.

Further, in exemplary embodiments, the time interval duration $T_x$ in Equation 1 is expressed in hours. For example, a duration of one day may be expressed as 24 hours, and a duration of one week may be expressed as 168 hours. Accordingly, the decay rate $D_x$ may be expressed as a change in intensity percentage i per hour.

In exemplary embodiments, controller 210 selects 325 the minimum decay rate D from the calculated decay rates. For example, if the weekly decay rate is negative 0.1 percent per hour, and the monthly decay rate is negative 0.06 percent per hour, controller 210 will select 325 the weekly decay rate as decay rate D. Selecting 325 the minimum decay rate facilitates providing a worst-case prediction of a sensor malfunction.

Controller 210 estimates 330 a predicted flame sensor malfunction time based at least in part on the minimum decay rate. Equation 3 is an exemplary function for estimating 330 a predicted flame sensor malfunction time.

$$T_{trip} = \frac{Y_{trip} - Y}{D} \quad \text{(Eq. 3)}$$

In Equation 3, $Y_{trip}$ is a flame-out threshold value (e.g., 20%), and Y is the current indicated flame intensity from flame sensor 235. During operation of combustion engine 205, when Y is less than $Y_{trip}$, controller 210 recognizes a flame-out condition. In response, controller 210 provides an alarm to operator 225 and/or disables combustion engine 205. By dividing the difference between $Y_{trip}$ and Y (a negative percentage value) by the decay rate D (a negative percentage value per hour), a predicted malfunction time or fake flame-out time $T_{trip}$ (a positive number of hours) is calculated. In exemplary embodiments, $T_{trip}$ represents the duration (a relative time) between the current time and the time at which flame sensor 235 is predicted to indicate an absence of a flame when a flame is present, such as by indicating a flame intensity below the flame-out threshold value. Alternatively, such a duration may be added to the current time to determine the absolute time at which flame sensor 235 is predicted to malfunction.

In some embodiments, controller 210 provides 335 a sensor malfunction alarm and/or a maintenance task when the predicted flame sensor malfunction time $T_{trip}$ is within a predetermined duration of the current time. The predetermined duration may be a static quantity of time (e.g., 120 hours, 160 hours, or 200 hours), a quantity of time between the current time and the task time associated with an existing maintenance task, or any other quantity of time suitable for use with the methods described herein. In addition, or alternative to, controller 210 may present the value of $T_{trip}$.

In one example, the sensor malfunction alarm may include a message transmitted to operator 225 and/or technician 230, a graphical notification displayed to operator 225, and/or an audible alarm. The maintenance task represents a repair of flame sensor 235 and may be provided 335 to technician 230 via maintenance device 215. Such a repair may include, for example, cleaning or replacing at least a portion of flame sensor 235. Further, when providing 335 a maintenance task, controller 210 and/or maintenance device 215 may consolidate the maintenance task with an existing maintenance task. For example, an existing maintenance task associated with an existing task time before the predicted flame sensor malfunction time may be identified, and the new maintenance task may be associated with the existing task time. Such embodiments facilitate reducing total downtime of combustion engine 205 by consolidating work that may require combustion engine 205 to be disabled.

The malfunction alarm and/or maintenance task is resolved 337, such as by operator 225 and/or technician 230. After this resolution 337, combustion engine 205 is again operated (e.g., restarted), and method 300 may be repeated.

In some embodiments, intensity readings associated with times at which combustion engine 205 is not operating in a steady state are disregarded. For example, in one embodiment, controller 210 selects 306 from the acquired intensity readings a plurality of stable operation intensity readings. Each of the stable operation intensity readings is associated with a time at which combustion engine 205 has been operating for at least a predetermined duration (e.g., 12 hours, 24 hours, or 48 hours). Controller 210 proceeds to calculate 310 the current average intensities based on the stable operation intensity readings.

Some embodiments facilitate notifying operator 225 when flame sensor 235 consistently indicates a flame intensity below a low flame intensity threshold value. The low flame intensity threshold value may be different from the flame-out threshold value. For example, the flame-out threshold value may be defined as 10%, 20%, or 30%, and the low flame intensity threshold value may be defined as 40%, 50%, or 60%. Continued intensity readings below the low flame threshold value may indicate a flame-out condition and/or that flame sensor 235 is currently malfunctioning (e.g., due to accumulation of dirt or combustion byproducts). In either case, operator 225 may wish to inspect combustion engine 205 and/or flame sensor 235.

In exemplary embodiments, controller 210 selects 340 from the series of acquired intensity readings a plurality of recent intensity readings. The recent intensity readings are associated with a time that is within a predetermined duration (e.g., 30 seconds, 1 minute, or 2 minutes) of the current time. Controller 210 provides 345 (e.g., transmits, displays, and/or sounds) a low flame intensity alarm when all of the recent intensity readings are below the low flame intensity threshold value. Optionally, controller 210 may automatically disable 350 combustion engine 205.

Embodiments provided herein facilitate automated detection and notification of decreased flame sensor performance in a combustion machine. Further, such embodiments enable automatically estimating the time at which a flame sensor will malfunction, such as by indicating a flame intensity below a flame-out threshold value even when a flame is present. This predicted malfunction time may be used to schedule a maintenance task, such that the flame sensor can be repaired prior to the occurrence of a malfunction.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other apparatus and methods.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for use in evaluating an operation of a combustion engine including a flame sensor, said system comprising:
   a memory device configured to store:
      a plurality of intensity readings from a flame sensor, wherein each intensity reading is associated with a time; and
      a plurality of past average intensities, wherein each past average intensity is associated with a past time interval; and
   a processor coupled in communication with said memory device and programmed to:
      calculate a plurality of current average intensities based on the intensity readings, wherein each current average intensity corresponds to a current time interval;
      compare each current average intensity to a past average intensity associated with a past time interval corresponding to the current time interval associated with the current average intensity to create a plurality of decay rates; and
      estimate a predicted flame sensor malfunction time based on the plurality of decay rates.

2. A system according to claim 1, wherein the flame sensor is configured to detect a flame in a combustion engine, and said processor is further programmed to:
   select from the intensity readings a plurality of stable operation intensity readings, wherein each stable operation intensity reading is associated with a time at which the combustion engine has been operating for at least a predetermined duration; and calculate the current average intensities based on the stable operation intensity readings.

3. A system according to claim 1, wherein said processor is programmed to estimate the predicted flame sensor malfunction by estimating a time at which the flame sensor will indicate an absence of a flame when a flame is present.

4. A system according to claim 1, further comprising an output device configured to provide a sensor malfunction alarm when the predicted flame sensor malfunction time is within a predetermined duration of a current time.

5. A system according to claim 1, wherein said processor is further programmed to:
   select a minimum decay rate from the plurality of decay rates; and
   estimate the predicted flame sensor malfunction time based at least in part on the selected decay rate.

6. A system according to claim 1, wherein said processor is further programmed to select a plurality of recent intensity readings associated with a time that is within a predetermined duration of a current time, said system further comprising an output device configured to provide a low flame intensity alarm when the recent intensity readings are below a predetermined threshold value.

7. A system according to claim 1, wherein said processor is programmed to calculate the plurality of decay rates at least in part by calculating a daily decay rate and a weekly decay rate.

8. A method for use in evaluating an operation of a combustion machine including a flame sensor, said method comprising:
   calculating by a computing device a plurality of current average intensities based on a series of intensity readings from a flame sensor, wherein each current average intensity corresponds to a current time interval;
   selecting by the computing device a plurality of past average intensities, wherein each past average intensity corresponds to a past time interval equal in duration to the current time interval corresponding to a current average intensity;
   calculating by the computing device a plurality of decay rates indicating a change in intensity readings over time based on the current average intensities and the past average intensities, wherein each decay rate corresponds to a current time interval; and
   estimating by the computing device a predicted flame sensor malfunction time based on the plurality of decay rates.

9. A method according to claim 8, wherein estimating the flame sensor malfunction time comprises estimating a time at which the flame sensor will indicate an absence of a flame when a flame is present.

10. A method according to claim 8, wherein estimating a predicted flame sensor malfunction time based on the plurality of decay rates comprises:
    selecting a minimum decay rate from the plurality of decay rates; and
    estimating the predicted flame sensor malfunction time based at least in part on the selected decay rate.

11. A method according to claim 8, wherein calculating a plurality of decay rates comprises calculating a weekly decay rate and a monthly decay rate.

12. A method according to claim 8, wherein the flame sensor is configured to detect a flame in a combustion machine, and the current average intensities are calculated based on intensity readings associated with a time at which the combustion machine has been operating for at least a predetermined duration.

13. A method according to claim 8, further comprising:
    acquiring the series of intensity readings produced by the flame sensor; and
    applying by the computing device a second order filter to the intensity readings prior to calculating the current average intensities.

14. A method according to claim 8, further comprising:
    identifying by the computing device an existing maintenance task associated with an existing task time before the predicted flame sensor malfunction time; and
    creating a maintenance task representing a repair of the flame sensor, wherein the created maintenance task is associated with the existing task time.

15. A method according to claim 8, further comprising
    selecting from the series of intensity readings a plurality of recent intensity readings associated with a time that is within a predetermined duration of a current time; and
    providing a low flame intensity alarm when the recent intensity readings are below a predetermined threshold value, wherein the low flame intensity alarm indicates at least one of a flame sensor malfunction and a flame-out condition.

16. One or more non-transitory computer-readable storage media having computer-executable instructions embodied thereon, wherein when executed by at least one processor, the computer-executable instructions cause the processor to:
    calculate a plurality of current average intensities based on a series of intensity readings from a flame sensor, wherein each current average intensity corresponds to a current time interval;
    calculate a plurality of decay rates indicating a change in intensity readings over time based on the current average intensities and a plurality of past average intensities, wherein each decay rate corresponds to a current time interval; and
    estimate a predicted flame sensor malfunction time based on the plurality of decay rates.

17. The computer-readable storage media of claim 16, wherein the computer-executable instructions further cause the processor to estimate the predicted flame sensor malfunction by estimating a time at which the flame sensor will indicate an absence of a flame when a flame is present.

18. The computer-readable storage media of claim 16, wherein the computer-executable instructions further cause the processor to estimate the predicted flame sensor malfunction time based on a minimum decay rate of the plurality of decay rates.

19. The computer-readable storage media of claim 16, wherein the flame sensor is configured to detect a flame in a combustion engine, and the computer-executable instructions further cause the processor to calculate the current average intensities based on intensity readings associated with a time at which the combustion engine has been operating for at least a predetermined duration.

20. The computer-readable storage media of claim 16, wherein the computer-executable instructions further cause the processor to provide a sensor malfunction alarm when the predicted flame sensor malfunction time is within a predetermined duration of a current time.

* * * * *